(12) United States Patent
Quint et al.

(10) Patent No.: US 8,577,332 B1
(45) Date of Patent: Nov. 5, 2013

(54) METHOD AND SYSTEM FOR OFFERING A FEMTOCELL TO A SUBSCRIBER

(75) Inventors: Joe B. Quint, Lenexa, KS (US); Aseem Khanna, Leawood, KS (US); Matthew J. Pierce, Olathe, KS (US); Thomas J. Linnemeyer, Naperville, IL (US)

(73) Assignee: Sprint Spectrum L.P., Overland Park, KS (US)

( * ) Notice: Subject to any disclaimer, the term of this patent is extended or adjusted under 35 U.S.C. 154(b) by 685 days.

(21) Appl. No.: 12/725,716

(22) Filed: Mar. 17, 2010

(51) Int. Cl.
*H04W 4/24* (2009.01)

(52) U.S. Cl.
USPC ......... 455/406; 705/1.1; 705/345; 455/456.1; 455/456.3; 455/446; 455/422.1

(58) Field of Classification Search
USPC ............. 705/1.1, 345; 455/456.1, 456.3, 406, 455/446, 422.1
See application file for complete search history.

(56) References Cited

U.S. PATENT DOCUMENTS

| | | | |
|---|---|---|---|
| 6,163,696 A * | 12/2000 | Bi et al. ................ | 455/436 |
| 6,266,514 B1 | 7/2001 | O'Donnell | |
| 6,915,128 B1 | 7/2005 | Oh | |
| 7,076,245 B1 | 7/2006 | Satapathy | |
| 7,136,636 B1 | 11/2006 | McLaughlin | |
| 8,089,400 B1 * | 1/2012 | Fang et al. ............... | 342/357.42 |
| 8,094,551 B2 * | 1/2012 | Huber et al. ............... | 370/229 |
| 2002/0187792 A1 * | 12/2002 | Kato et al. ............... | 455/456 |
| 2004/0219931 A1 * | 11/2004 | Bi et al. ............... | 455/456.1 |
| 2005/0159171 A1 * | 7/2005 | Kaneko ............... | 455/456.1 |
| 2007/0149195 A1 * | 6/2007 | Choe et al. ............... | 455/436 |
| 2008/0244148 A1 * | 10/2008 | Nix et al. ............... | 710/313 |
| 2009/0042536 A1 * | 2/2009 | Bernard et al. ............... | 455/406 |
| 2009/0213825 A1 * | 8/2009 | Gupta et al. ............... | 370/338 |
| 2009/0253441 A1 * | 10/2009 | Wallis ............... | 455/456.3 |
| 2009/0318132 A1 * | 12/2009 | Chiou et al. ............... | 455/423 |
| 2010/0035601 A1 * | 2/2010 | Chen et al. ............... | 455/423 |
| 2010/0113035 A1 * | 5/2010 | Eskicioglu et al. ............ | 455/444 |
| 2010/0157911 A1 * | 6/2010 | Hegde et al. ............... | 370/329 |
| 2010/0178934 A1 * | 7/2010 | Moeglein et al. ............ | 455/456.1 |
| 2010/0184423 A1 * | 7/2010 | Kent et al. ............... | 455/422.1 |

* cited by examiner

*Primary Examiner* — Matthew Sams
*Assistant Examiner* — Diego Herrera

(57) ABSTRACT

A method and system for offering a femtocell to a subscriber. The method includes a computer system making a first determination that a level of wireless performance experienced by a mobile station of a subscriber at a given location is less than a threshold level. The method further includes the computer system making a second determination that the given location is location associated with a billing address of the subscriber. The method then includes, in response to the first and second determinations, the computer system initiating a process of offering a femtocell to the subscriber.

20 Claims, 5 Drawing Sheets

METHOD AND SYSTEM FOR OFFERING A FEMTOCELL TO A SUBSCRIBER

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another CDMA protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, LTE, iDEN and/or any others.

These networks typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g., voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

2. Femtocells

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g., IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g., in buildings) and for other reasons, macro-network service providers have begun offering consumers devices referred to herein as femtocells, which may also be referred to as femto base stations, femto base transceiver stations (BTSs), picocells (pico base stations, pico BTSs), microcells (micro base stations, micro BTSs), Low-Cost Internet Base Stations (LCIBs), and by other names. Note that the aforementioned terms that end in "cell" may also be generally and herein used to refer to the coverage area provided by the respective device. Note also that "low-cost" is not used as a limiting term; that is, devices of any cost may be categorized as LCIBs, though most LCIBs typically will be much less expensive on average than most macro-network base stations.

A typical femtocell may be approximately the size of a desktop phone or WiFi access point, and is essentially a low-power, low-capacity version of a macro base station. Thus, a typical femtocell will use a normal power outlet, perhaps with a transformer providing a DC power supply. The femtocell may have a wired (e.g., Ethernet) or wireless (e.g., WiFi) connection with the user's router, and would thus have connectivity to the Internet and/or one or more other packet-data networks via the user's broadband connection. A femtocell may establish a virtual-private-network (VPN) connection over the Internet with an entity (e.g., a VPN terminator) on the wireless-service (macro-network) provider's core network, and thereby be able to securely communicate via the VPN terminator with other entities on that core network and beyond.

The femtocell also has a wireless-communication (e.g., CDMA) interface that is compatible with the user's mobile station(s), such that the femtocell may act as a micro base station, providing coverage on the wireless-service provider's network via the user's Internet connection. Usually, a femtocell will provide service on a single RF carrier (or on a single carrier per technology, where multiple technologies (e.g., 1xRTT and EV-DO) are supported), and also transmit what is known as a pilot beacon, which includes administrative messages and parameters that mobile stations use to connect with the femtocell.

OVERVIEW

Femtocells are designed to have low transmission-power capabilities, and consequently to provide coverage areas that are relatively limited in comparison with those of typical macro base stations. As examples, a typical femtocell may be designed to provide a coverage area that is the size of a dorm room, an apartment, a house, and so on. Femtocells may be particularly useful for providing wireless coverage at a given location that, for one reason or another, experiences poor macro-network wireless coverage. For example, a subscriber may experience poor macro-network wireless coverage at the subscriber's home, and thus the subscriber may experience improved wireless coverage at the subscriber's home if the subscriber uses a femtocell at the home.

In the wireless-communication service, low customer satisfaction is a reason many subscribers leave a given wireless service provider. For example, subscribers with a low customer satisfaction may opt to switch to a different wireless service provider. Poor wireless coverage at a given location where a subscriber often uses his or her mobile phone is likely to lead to low customer satisfaction. Improving wireless performance at such a location, however, may help to increase a subscriber's customer satisfaction and thus may help to prevent the subscriber from switching to a different wireless service provider.

Accordingly, disclosed herein is a method and system for identifying subscribers that may be good candidates for using a femtocell and offering a femtocell to the subscribers. In particular, the disclosed method and system focus on identifying subscribers that may benefit from using a femtocell at a location associated with the subscriber's account, such as a billing address of the account. In accordance with the method disclosed herein, a computer system initiates a process of offering a femtocell to a subscriber in response to determining that the subscriber has experienced poor wireless performance at a location that is associated with the billing address of the subscriber's account.

In particular, the method includes a computer system making a first determination that a level of wireless performance experienced by a mobile station of a subscriber at a given location is less than a threshold level. The computer system also makes a second determination that the given location is location associated with a billing address of the subscriber. In response to the first and second determinations, the computer system initiates a process of offering a femtocell to the subscriber. Offering a femtocell to the subscriber may facilitate improving the subscriber's wireless performance at the billing address.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Introduction

As noted above, the disclosed method and system provide for identifying a mobile station that has experienced poor wireless performance at a location associated with the billing address of the mobile station's subscriber and responsively offering a femtocell to the subscriber. The disclosed method and system may be of particular benefit to both subscribers of wireless service and wireless service providers. For example, the disclosed method and system may benefit a subscriber by leading to improved wireless coverage at the subscriber's billing address (e.g., home). As a result of improved coverage at the subscriber's address, the subscriber's customer satisfaction in the wireless service provider may increase. This increased customer satisfaction may benefit a wireless service provider by reducing or minimizing subscriber turnover due to low customer satisfaction.

2. Exemplary Communication System Architecture

Figure 1:
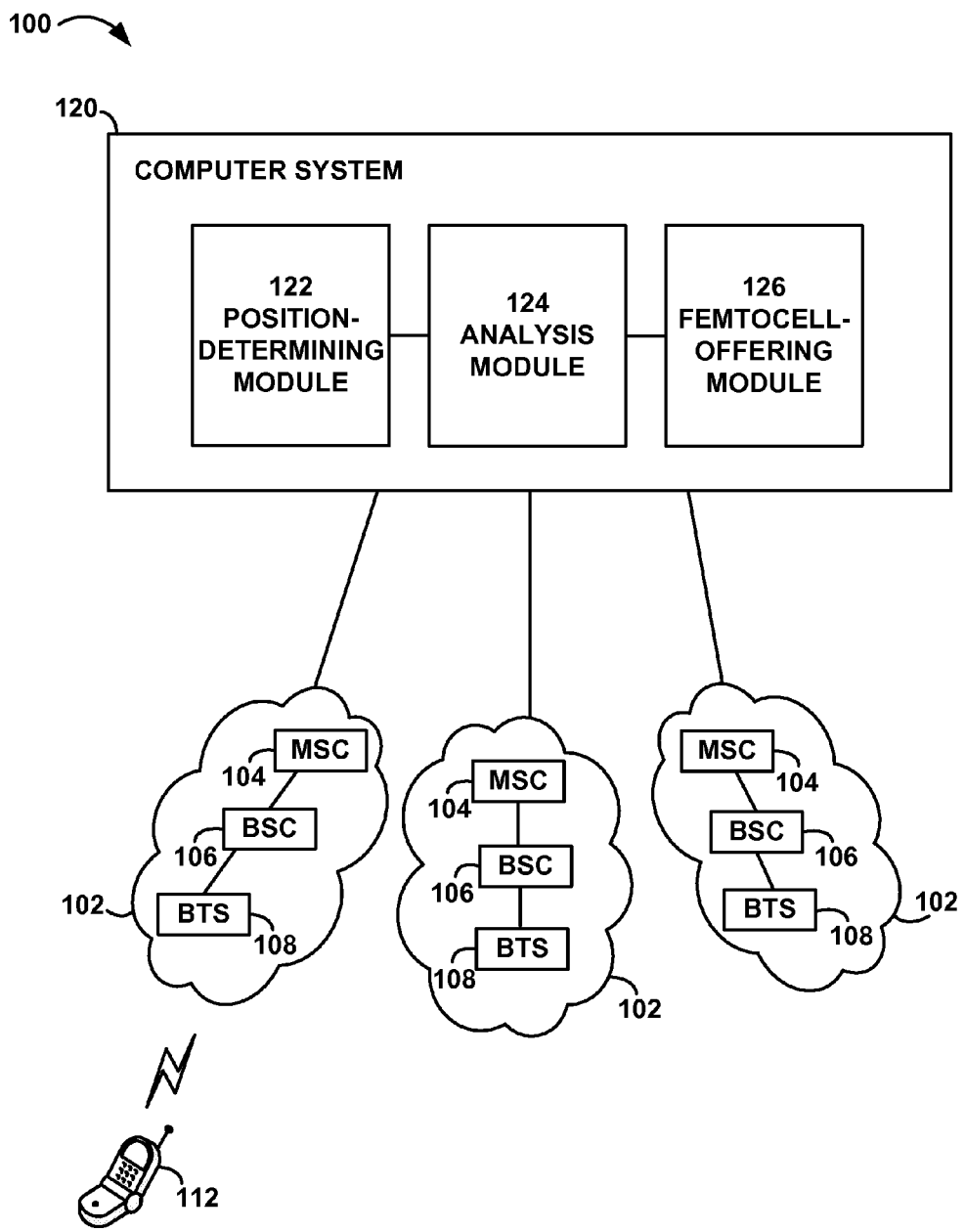
FIG. 1 is a simplified block diagram of a communication system in accordance with exemplary embodiments.

FIG. 1 is a simplified block diagram of a communication system in which the proposed method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

System 100 includes a number of radio access networks (RANs) 102, each of which is controlled by a switching entity such as a mobile switching center (MSC) 104. The MSC generally includes or connects with one or more base station controllers (BSCs) 106, which in turn connect with one or more base transceiver stations (BTSs) 108. Each BTS may include a cell tower with one or more antennas that radiate to define an air interface 110 in which mobile stations can operate. With this arrangement, mobile stations, such as mobile station 112, can communicate through RAN 102 with entities on a transport network such as a public switched telephone network (PSTN) or the Internet. Although depicted as only communicating through one RAN 102, mobile station 112 is also capable of communicating through the other RANs 102.

Mobile station 112 can take various forms, examples of which include a mobile phone, a personal digital assistant, a wirelessly equipped personal computer, or another wirelessly equipped device of any sort. Each RAN 102 generally functions to serve wireless mobile stations such as mobile station 112 and/or other mobile stations, so as to provide those devices with resources such as the ability to communicate with other entities (or with each other) via the RAN. As such, each RAN 102 may take various forms, the details of which are not critical and may depend on the air-interface protocol of the RAN 102 and on other factors.

System 100 also includes a computer system 120 that is in communication with each RAN 102 and that is operable to identify a subscriber who may benefit from using a femtocell at the subscriber's billing address and to facilitate offering a femtocell to the subscriber. FIG. 1 depicts each RAN 102 communicating directly with computer system 120; however, in other examples, computer system 120 may communicate with each RAN 102 through a front-end communication node (not shown). In an embodiment and as shown in FIG. 1, the system 120 may have modules that are configured to perform various steps of the disclosed method. For example, position-determining module 122 may be configured to determine, for each of a plurality of mobile events of a mobile station of a given subscriber, a location where the mobile event occurred. Further, an analysis module 124 may be configured to (i) make a first determination that a level of wireless performance experienced by a mobile station of a subscriber at a given location is less than a threshold level and (ii) make a second determination that the given location is location associated with a billing address of the subscriber. Still further, a femtocell-offering module 126 may be configured to initiate a process of offering a femtocell to the subscriber responsive to the first and second determinations.

Figure 2:
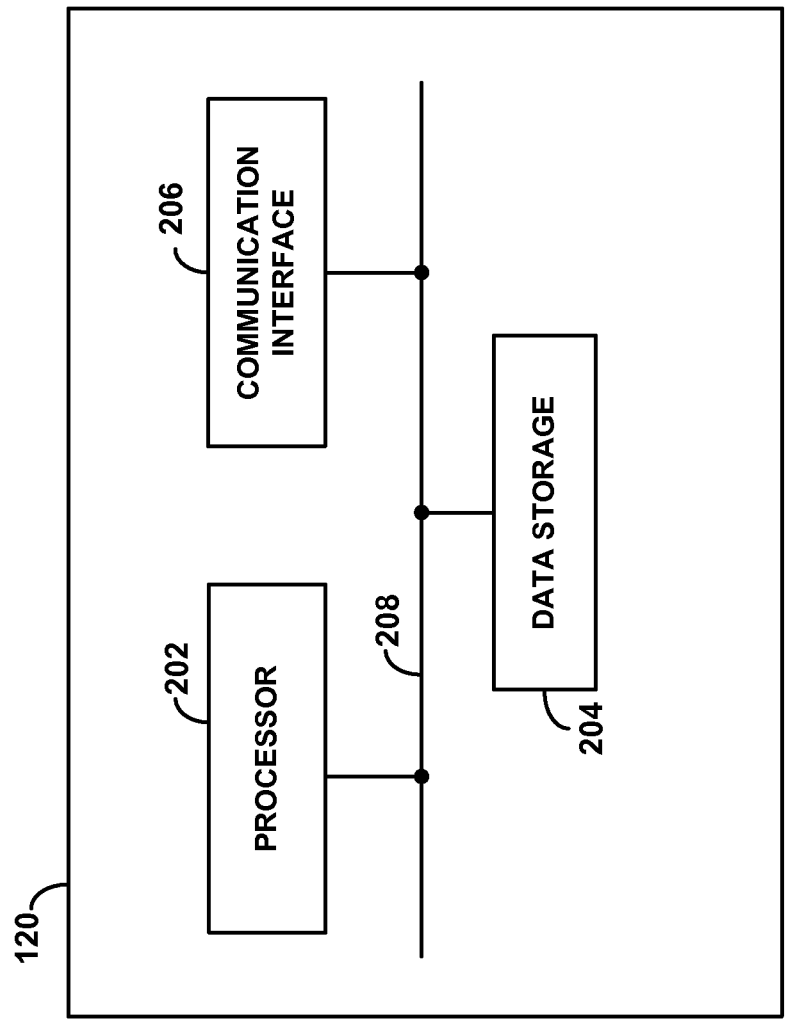
FIG. 2 is a simplified block diagram of an exemplary system for offering a femtocell to a subscriber that can be used in the arrangement of FIG. 1.

These modules 122, 124, and 126 may each share a single processor. For example, FIG. 2 depicts computer system 120, which includes modules 122, 124, 126, as including a single processor. However, in another example of the disclosed method and system, each module may include a single dedicated processor or dedicated processors configured for carrying out the described steps. Beneficially, including multiple processors in system 120 may increase the processing speed and power of system 120.

3. Exemplary Computer System Components

FIG. 2 is a block diagram of an exemplary system 120, illustrating some of the components that could be included in such a system to carry out the disclosed method. As shown in FIG. 2, the system 120 may include a processor 202, data storage 204, and a communication interface 206, all of which may be coupled together by a system bus or other mechanism 208.

Each of these components of the system 120 may take various forms. For instance, processor 202 could be one or more general purpose microprocessors and/or dedicated signal processors. Data storage 204 could be volatile and/or nonvolatile memory, such as flash memory. The communication interface 206 could include one or more antennas, chipsets, and/or other components for communicating with other entities in the wireless network. The system 120 could communicate through communication interface 206 with, for example, RAN 102.

In an example of the disclosed method, data storage 204 may hold billing address information for subscribers of a wireless service provider. Data storage 204 also may hold a set of logic (e.g., computer instructions) executable by processor 202 to carry out various functions described herein. For example, system 120 may receive mobile event record data (commonly referred to as Per Call Measurement Data (PCMD)) from RAN 102. Based on information from the received mobile event record data, processor 202 could make a first determination that a level of wireless performance experienced by a mobile station of a given subscriber at a given location is less than a threshold level. The processor 202 could also make a second determination that the given location is location associated with a billing address of the given subscriber. Responsive to the first and second determinations, the processor 202 could initiate a process of offering a femtocell to the given subscriber. In some embodiments of the disclosed method, one or more of these functions can be carried out by firmware and/or hardware.

4. Exemplary Operation

Figure 3:
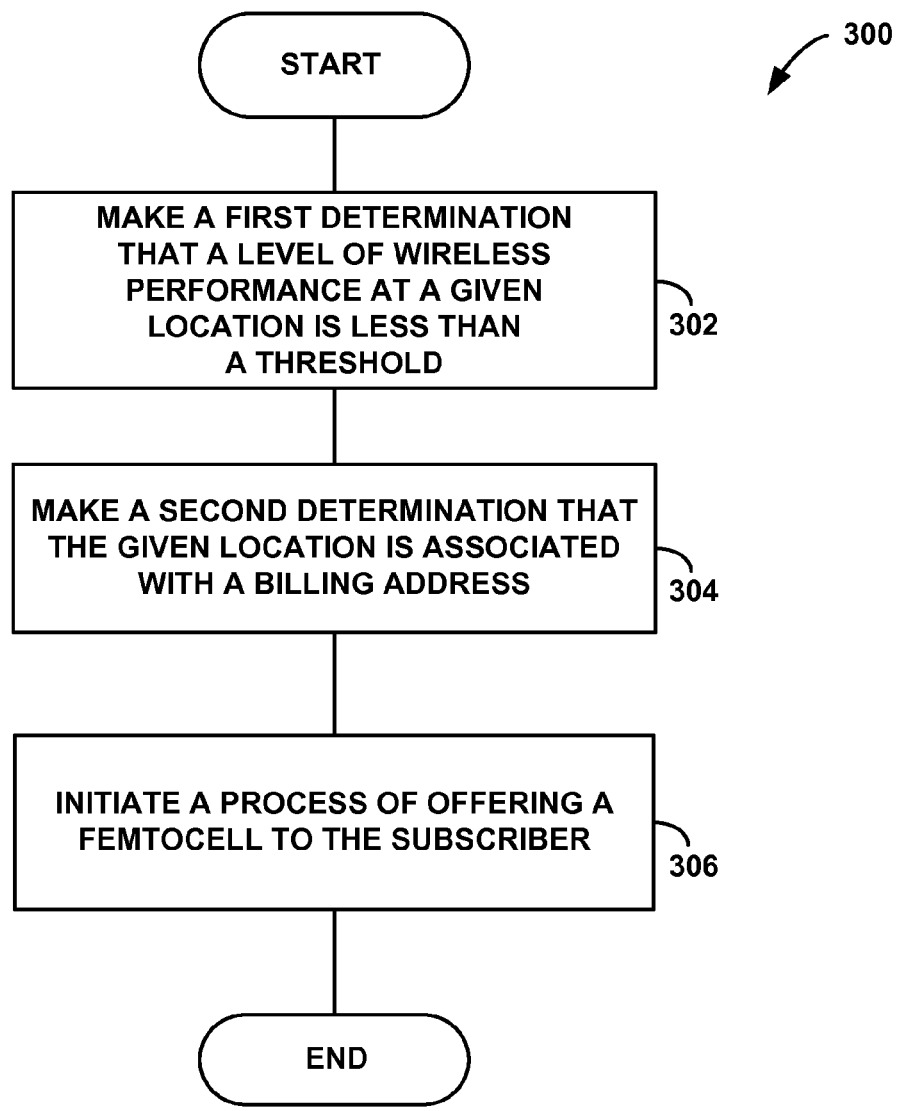
FIG. 3 is a flow chart of a method that can be carried out in accordance with exemplary embodiments.

Referring next to FIG. 3, a flow chart is provided to help illustrate some of the functions that can be carried out by a system configured to offer a femtocell to a subscriber, such as computer system 120. FIG. 3 illustrates method 300, which is a method for identifying a subscriber that may benefit from using a femtocell at a location associated with the billing address of the subscriber and responsively offering a femtocell to the identified subscriber. As shown in FIG. 3, method 300 begins at step 302, where the computer system 120 makes a first determination that a level of wireless performance experienced at a given location by a mobile station of a subscriber is less than a threshold level. As mentioned above, the mobile station of a subscriber can take various forms, examples of which include a mobile phone, a personal digital assistant, a wirelessly equipped personal computer, or another wirelessly equipped device of any sort. At step 304, the computer system 120 makes a second determination that the given location is location associated with a billing address of the subscriber. Then, in response to the first and second determinations, at step 306, the computer system 120 initiates a process of offering a femtocell to the subscriber. In method 300, the first determination may be made before the second determination and vice versa.

As mentioned above, at step 302, the system 120 may determine that a level of wireless performance experienced by a mobile station at a given location is less than a threshold level. In order to make this determination, system 120 may first identify a plurality of the mobile events of a mobile station of a given subscriber. The given subscriber may be, for example, the user of mobile station 112. System 120 may then identify the location of each of those identified mobile events. As is know in the art, a network switch, such as MSC 104, may collect mobile event record data (e.g., PCMD data), which may include data about the mobile events that occur in the network.

The mobile event record data may include data about the type of mobile event that occurred and various other data related to the mobile event. For the purposes of the disclosed method and system, a mobile event may be any mobile event of mobile station 112. For example, mobile events may include but are not limited to phone calls, text messages, and data usage. The mobile event record data may also include other data related to the mobile event, such as data related to the mobile device, the base station, the BSC, the MSC, and other components of the RAN involved with the mobile event. This data may include, for instance, the switch cell sector and a round trip delay measurement from a base station or base stations in the RAN. Such mobile event record data may also be data that is associated with negative mobile events. These negative mobile events may be any mobile event that affects the subscriber in an undesirable way and/or lowers customer satisfaction. For example, negative mobile events may include blocked calls, dropped calls, and roaming events. Other example negative mobile events are possible as well. Negative mobile events may indicate wireless coverage issues. Negative mobile events may be recorded in the mobile event record data after the MSC or another entity in the RAN detects the negative mobile event. Detection of negative mobile events is well known in the art and thus is not described in great detail. However, as an example, with respect to dropped calls, usually a call-drop event occurs because the signal strength of RF signals received by the mobile station and/or by the base station becomes too low, and the RF link is lost. When this occurs, the MSC may record the dropped call. It should be noted, however, that other circumstances may cause a call-drop event as well.

MSC 104 may send mobile event record data related to mobile station 112 to system 120. After receiving the mobile event record data, system 120 may analyze the data to determine the location of each mobile event of mobile station 112. It should be noted that MSC 104 may collect and send to system 120 mobile event record data related to a plurality of mobile stations, and in such a case, the system 120 may perform the disclosed method for each of the plurality of mobile stations. The analysis of the mobile event record data is described in greater detail below with reference to position-determining module 122 and analysis module 124.

After receiving the mobile event record data for mobile station 112 from MSC 104, the position-determining module 122 may determine the location of all of the mobile events of mobile station 112. Determining the location of a mobile event based on mobile event record data is well known in the art and is thus not described in great detail. Generally, the position-determining module 122 may employ any of a variety of position-determining calculations. For example, position-determining module 122 may calculate location using a triangularization method (also commonly referred to as triangulation), which is well known in the art. Using a triangularization method, the position-determining module 122 may determine a geographic location of each mobile event (e.g., the latitude and longitude for each mobile event). In an example, the position determining module may calculate the latitude/longitude coordinates based on round-trip-delay data and base-station-antenna azimuth data. Preferably, the mobile event data includes round-trip-delay data and base-station-antenna azimuth data with respect to two or more base stations.

These location calculations based on mobile event record data received from the MSC may be performed after the mobile event has actually occurred. However, in other examples of the disclosed method and as known in the art, location determination may take place during the time of the mobile event. For example, the MSC, perhaps in communication with a position-determining entity, may determine the location of each mobile event as the mobile event occurs. These entities may employ any of a variety of position-determining technologies to determine the location of mobile events. For instance, this location determination may be handset-based (e.g., Global Positioning System (GPS) technology) or network-based (e.g., triangularization). If location is determined at the time of the mobile event, an MSC may keep a location history log for a mobile station and may send the determined locations to system 120.

After identifying a location where each mobile event of mobile station 112 occurred, the analysis module 124 of system 120 may identify the mobile events that occurred at a given location. In an example of method 300, analysis module 124 may determine that a level of wireless performance at the given location is less than a threshold and then analysis module 124 may then make a determination that the given location is a location associated with a subscriber's billing address. However, in another example of method 300, after identifying the location of each mobile event of mobile station 112, analysis module 124 may determine that a given location is associated with a subscriber's billing address. The analysis module 124 may then compare the identified location of each mobile event to the subscriber's billing address to determine which mobile events occurred at the billing address. The analysis module 124 may then determine that a level of wireless performance at the billing address is less than a threshold.

The analysis module 124 may identify the location of the billing address in a variety of ways. For example, module 124 may identify the location of the billing address 412 by the latitude and longitude coordinates of the billing address. However, in another example, the analysis module 124 may identify the location of the billing address by the "zip+4" code of the billing address. Identifying the location of the billing address by the "zip+4" code rather than latitude and longitude coordinates will typically result in a more coarse location for the billing address. However, the accuracy of a "zip+4" identification is typically within approximately 100 meters.

It is contemplated that in most situations the billing address will be the home address of the subscriber. However, the billing address may be other location as well, such as a business address. Further, in some cases, multiple mobile stations may be associated with a billing address. For example, a subscriber may subscribe to what is commonly referred to as a "family plan." For instance, a parent may use a first mobile phone and a child may use a second mobile station, with both mobile stations being associated with the same billing address. In such a situation, the analysis module 124 may analyze the mobile events of both mobile stations to determine if at least one of them experiences a level of wireless performance at the billing address that is less than a threshold.

Figure 4:
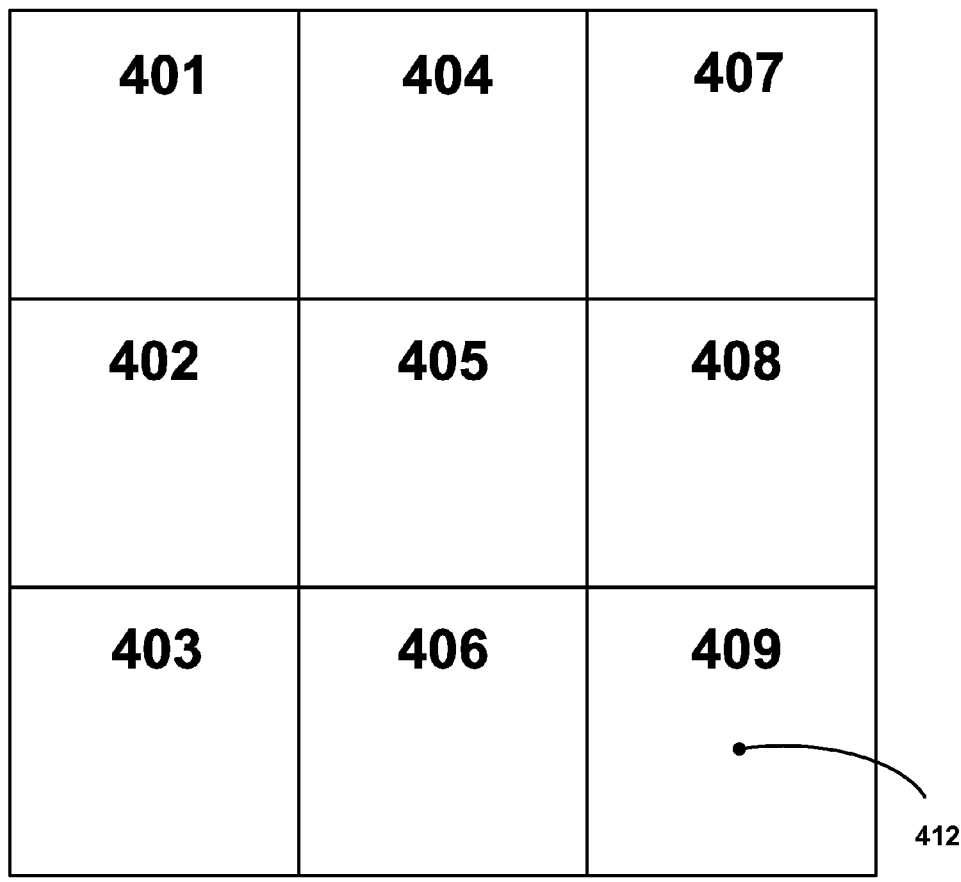
FIG. 4 is a depiction of a first grid in accordance with an exemplary embodiment.

The analysis module 124 may identify mobile events of a mobile station that occurred at a given location in a variety of ways. For example, the analysis module 124 may identify an area surrounding the given location and may treat mobile events that occurred within the area as mobile events that occurred at the given location. As a particular example of identifying an area surrounding the given location, analysis module 124 may use a grid. Specifically analysis module 124 may place a grid over an area for which the wireless communication system 100 provides coverage. FIG. 4 depicts a grid 400 that overlays an example area. As shown, the grid 400 breaks the area into nine grid sections 401-409. In an example, the grid sections are each 500×500 meters. However, it should be understood that the grid sections may be any suitable shape and size. For example, the size may be smaller or larger than 500×500 meters (e.g., 100×100 meters or 1,000×1,000 meters). Further, although the grid sections are depicted as square sections, the grid sections may be any suitable shape.

After placing a grid over an area, the analysis module 124 may determine the grid sections that the identified mobile events of mobile station 112 occurred in. Each grid section may have a border well-defined by latitude and longitude values, and using the determined locations of the mobile events (e.g., the determined latitude and longitude of each mobile event), the analysis module 124 may place each mobile event in the appropriate grid section. The analysis module 124 may identify which grid section the subscriber's billing address is located in. For example, billing address 412 may be located in grid section 409, as depicted in FIG. 4. The analysis module 124 may then treat the mobile events that occurred in the grid section 409 as mobile events that occurred at the billing address 412. Beneficially, by treating all mobile events that occurred in the grid section 409 as mobile events that occurred at billing address 412, all mobile events that actually occurred at billing address 412 will likely be taken into account by the analysis module 124.

Figure 5:
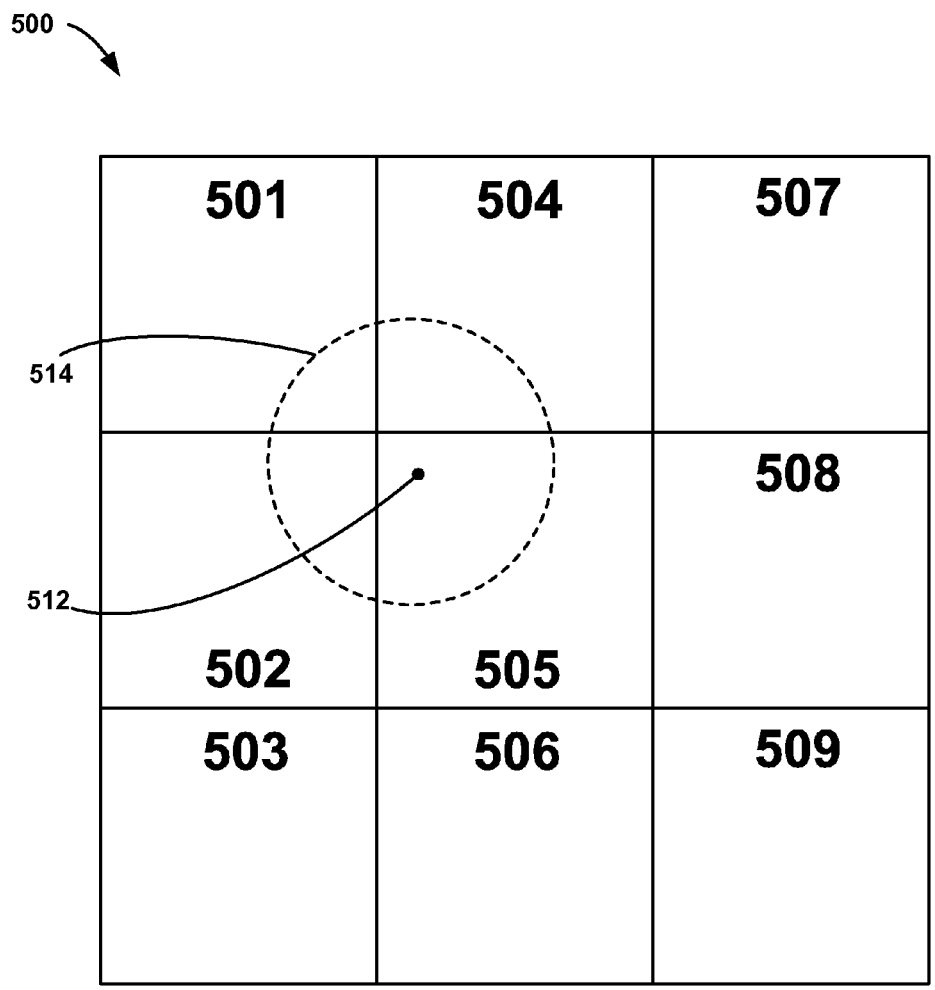
FIG. 5 is a depiction of a second grid in accordance with an exemplary embodiment.

However, in some examples, the billing address may be located near a corner or edge of a grid section. In such an example, all mobile events that actually occurred at that billing address will likely not be taken into account by the analysis module 124 if the module 124 only treats mobile events that occur in the grid section encompassing the billing address as mobile events that occurred at the billing address. For example, FIG. 5 depicts an area 500 having grid sections 501-509 and where billing address 512 is located at the top left corner of grid section 505. In this case, a mobile station operating at the billing address may experience poor coverage at locations that are located in grid sections other than grid section 505. For example, the mobile station operating at billing address 512 may experience poor coverage at locations that are located in grid sections 501, 502, 504, and 505. Thus, in this case, treating only mobile events that occurred in grid section 505 as mobile events that occurred at the billing address may result in not identifying all mobile events that occurred at the billing address.

Analysis module 124 may determine that a billing address is located near a corner or edge of a grid section. In such a case, the analysis module 124 may identify an area of a given radius around the given location, such as area 514. In an example, the radius may be a radius that corresponds to the range of a femtocell, such as 100 meters. The analysis module 124 may then identify each grid section that overlaps with the identified area, and then may treat mobile events that occurred in the identified grids as mobile events that occurred at the given location. In this example, grid sections 501, 502, 504, and 505 each have portions that are located in area 514. Thus, the analysis module 124 may treat mobile events that occur in grid sections 501, 502, 504, and 505 as mobile events that occurred at billing address 512.

After determining all of the mobile events that occurred at the given location associated with the subscriber's billing address, such as billing address 412 or billing address 512, the analysis module 124 may analyze those mobile events to determine a level of wireless performance experienced by the mobile station at the given location. Generally, the level of wireless performance is an indication of how well the mobile station 112 performs at the location and this level of wireless performance experienced by the mobile station at the billing address may be determined in various ways. In an example, the analysis module 124 may treat a ratio of negative mobile events to total mobile events as the level of wireless performance experienced by the mobile station at the given location. In order to do so, the analysis module 124 may first determine the number of negative mobile events that occurred at the given location. As mentioned above, these negative mobile events may include blocked calls, dropped calls, and roaming events. Other example negative mobile events are possible as well. The analysis module 124 may determine a ratio of the number of negative mobile events to a number of total mobile events that occurred at the given location, and this ratio may provide an indication of how well the mobile station 112 performs at the location. In another example, the analysis module may treat the total number of negative mobile events as the level of wireless performance experienced by the mobile station at the given location.

In a particular example of the disclosed method and system, the analysis module 124 may be configured to filter out network anomalies or aberrations from the analysis of the level of wireless performance experienced by the mobile station at the given location. Network anomalies may occur for various reasons. For example, a network anomaly may be caused by a natural disaster, such as an earthquake or a flood. In another example, a network anomaly may be caused by a base station fire. Other causes of network anomalies are possible as well, such as a base station or RAN equipment failure. These network anomalies may result in a disruption in wireless coverage, which in turn may result in negative mobile events, such as dropped calls or blocked calls. Negative mobile events that occur during a network anomaly are likely due to the network anomaly itself and not due to poor coverage at the given location. Accordingly, the analysis module 124 may be configured to not treat negative mobile events that occurred due to a network aberration as a negative mobile event that occurred at the given location, thus filtering out mobile events that occurred as a result of the network anomaly.

After determining the level of wireless performance experienced by the mobile station at the billing address, the analysis module 124 may analyze the determined level of wireless performance to determine whether the subscriber is a candidate that may benefit from using a femtocell at the billing address. In particular, the analysis module 124 may determine that the level of wireless performance experienced by a mobile station of the subscriber at the billing address is less than the threshold level. The threshold level may be any suitable threshold level. For example, the threshold may be a given percentage of negative mobile events to total mobile events, such as 5%, 10%, 15%, etc. In a particular example, in order to determine an appropriate or suitable threshold, a wireless service provider may determine a wireless performance threshold level that leads toward a likelihood that a subscriber leave the wireless service provider, perhaps to switch to another wireless service provider. For example, a given level may be associated with a 25% percent chance or likelihood that a subscriber leave a wireless service provide.

After determining that the subscriber is a candidate that may benefit from using a femtocell at the billing address, femtocell-offering module 126 initiates a process of offering a femtocell to the subscriber at step 306. In accordance with the disclosed method and system, the offer may be any offer related to a femtocell, such as an advertisement for a femtocell or an offer for a free femtocell.

The femtocell-offering system may initiate the process or offering a femtocell to a subscriber and/or offer a femtocell to a subscriber in a variety of ways. For instance, femtocell-offering module 126 may be configured to send a text message or an email message to the subscriber. In another example, the femtocell-offering module 126 may be configured to load the subscriber's mobile-station number into an automatic dialer, and a customer service representative may offer a femtocell to the dialed subscriber. As yet another example, the femtocell-offering module 126 may be configured to print out a letter to the subscriber, and the letter may then be mailed to the subscriber's billing address via postal mail.

The femtocell-offering module may also initiate a process of offering a femtocell to the subscriber by flagging a profile of the subscriber in some sort of way, and the flag may serve to indicate that the subscriber is a candidate to which to offer a femtocell. A flagged profile may be useful to a customer-service representative of a wireless service provider. For instance, when a subscriber enters a store of the wireless service provider, a customer-service representative may pull up the profile of the subscriber. The customer-service representative may see the flag and may then know to offer a femtocell to the subscriber or discuss femtocell benefits with the subscriber. Other examples of initiating the process or offering a femtocell to a subscriber and/or offering a femtocell to a subscriber are possible as well.

Additional factors may be taken into consideration when identifying a candidate to which to offer a femtocell. For example, the system 120 may take into account the value of a subscriber to the wireless service provider (herein referred to as "marketing treatment value") when determining candidates that may benefit from using a femtocell. In an example, a wireless service provider may create general categories of marketing treatment values such as categories of low marketing treatment value, medium marketing treatment value, and high marketing treatment value. Additional or alternative categories are possible as well. Each marketing treatment value category may be associated with range of marketing treatment values (e.g., from a low threshold marketing treatment value to a high threshold marketing treatment value). The marketing treatment value may be determined in various ways. As an example, the marketing treatment value may reflect a subscriber's net present value to the wireless service provider. This net present value may take into account, for example, the customer's monthly recurring charge (MRC), the customer's credit class, and a prediction of the customer's future value.

System 120 may use the marketing treatment value of a subscriber as an additional element when determining whether to offer a femtocell to the subscriber. In an example of when system 120 takes marketing treatment value into account, if the marketing treatment value is above a threshold (e.g., a given marketing treatment value such as a net present value of $20.00 per month), the system 120 initiates a process of offering a femtocell to the subscriber. However, if the marketing treatment value is not above the threshold, the system 120 does not offer the subscriber a femtocell responsive to determining poor wireless performance at a location associate with the subscriber's billing address. This may beneficially increase the customer satisfaction of subscribers that are high-value subscribers.

In another example of when system 120 takes marketing treatment value into account, if the marketing treatment value is below a threshold, the system 120 initiates a process of offering a femtocell to the subscriber. Offering a femtocell to subscriber with a low marketing treatment value may beneficially improve wireless service for the subscriber. In addition to improving customer satisfaction, this may beneficially spur the subscriber to communicate more. As a result, this may increase the subscriber's marketing treatment value.

As another example of an additional factor that may be taken into consideration when identifying a candidate to which to offer a femtocell, system 120 may take into account radio-frequency (RF) coverage data. For instance, if RF coverage at a subscriber's home address is particularly poor, the wireless service provider may be more inclined to offer the subscriber a femtocell. RF-coverage data may be obtained in ways known in the art or later developed. For example, RF-coverage data may be data from drive testing or may be data from predications based on base station azimuth, beamwidth, power, and so forth.

A femtocell typically has a range that spans an area having a radius of about 100 meters. Further, the location determined by a triangulation position-determining process typically has an accuracy of around 250 meters. Still further, in some examples, the grid section size used by analysis module 124 may be larger than the area the billing address actually encompasses. For example, each grid may be sized 1000× 1000 meters, while the billing address only encompasses an area that is 75×75 meters. However, analysis module 124 may use the larger grid size to facilitate faster processing time of the mobile event data.

Due to the above, in some situations there may be some mobile events that the system 120 treats as negative mobile events that occurred at the billing address location even though the mobile events were not actually mobile events that occurred at the billing address location. In particular, this possibility may be due to, for example, the fact that the accuracy of the determined location may be off by an amount that is greater than the range of a femtocell. Additionally or alternatively, this possibility may be due to the fact that a grid section size used to analyze mobile event data may be larger than the area the billing address actually encompasses. In an example, system 120 may end up treating mobile events that occurred at a neighbor's house or a convenient store down the street as mobile events that occurred at the billing address. Accordingly, the disclosed method and system may result in situations where the system offers a femtocell to a subscriber even though using a femtocell at the subscriber's billing address would not actually improve wireless performance at the billing address. However, even with such potential identifications of mobile events that do not actually occur at the billing address, there will be an overall benefit in customer satisfaction for most subscribers of a wireless service provider.

5. Example Advantages of the Disclosed System and Method

Beneficially, the disclosed system and method may help to improve wireless service subscriber's satisfaction, by facilitating improved wireless performance at a billing address location where a subscriber experiences poor wireless performance. Wireless service providers may also benefit from the disclosed method and system, as the method and system may provide a way to lower or minimize subscriber turnover due to poor wireless performance at the subscriber's home.

6. Conclusion

Various exemplary embodiments have been described above. Those skilled in the art will understand, however, that changes and modifications may be made to those examples without departing from the scope of the claims.

We claim:

1. A method comprising:
a computer system making a first determination that a level of wireless performance experienced by a mobile station of a subscriber at a given location is less than a threshold level;
the computer system making a second determination that the given location is a location associated with a billing address of the subscriber;
in response to the first and second determinations, the computer system initiating a process of offering to provide a femtocell to the subscriber.

2. The method of claim 1, wherein making the first determination that the level of wireless performance at a given location is less than the threshold level comprises:
for each of a plurality of mobile events of the mobile station of the subscriber, the computer system determining a location where the mobile event occurred;
based on the determined locations of the mobile events, the computer system identifying mobile events that occurred at the given location;
the computer system analyzing the mobile events that occurred at the given location to determine the level of wireless performance experienced by the mobile station at the given location.

3. The method of claim 2, wherein the plurality of mobile events comprises mobile events selected from the group consisting of phone calls, text messages, and data usage.

4. The method of claim 2, wherein determining the location where the mobile event occurred comprises the computer system determining the location where the mobile event occurred based on a triangularization calculation.

5. The method of claim 2, wherein identifying mobile events that occurred at the given location comprises:
identifying an area surrounding the given location; and
treating mobile events that occurred within the area as mobile events that occurred at the given location.

6. The method of claim 2, wherein identifying mobile events that occurred at a given location comprises:
identifying a grid section that overlays the given location; and
treating mobile events that occurred in the grid section as mobile events that occurred at the given location.

7. The method of claim 6, wherein identifying mobile events that occurred at a given location further comprises:
   identifying an area of a given radius around the given location;
   identifying each grid section that overlaps with the area; and
   treating mobile events that occur in the identified grid sections as mobile events that occurred at the given location.

8. The method of claim 2, wherein analyzing the mobile events that occurred at the given location to determine a level of wireless performance experienced by the mobile station at the given location comprises:
   determining a number of negative mobile events that occurred at the given location;
   determining a number of total mobile events that occurred at the given location;
   determining a ratio of negative mobile events to total mobile events; and
   treating the ratio as the level of wireless performance experienced by the mobile station at the given location.

9. The method of claim 8, wherein the negative mobile events comprise at least one of a blocked call event, a dropped call event, and a roaming event.

10. The method of claim 8, wherein determining a number of negative mobile events that occurred at the given location comprises filtering out mobile events that occurred due to a network aberration.

11. The method of claim 1, wherein the threshold level is a percentage of negative mobile events that occurred at the given location compared to total mobile events that occurred at the given location.

12. The method of claim 11, wherein the threshold level is associated with a high propensity to leave a wireless service provider, and wherein the high propensity is a propensity greater than 25%.

13. The method of claim 1, wherein initiating a process of offering to provide a femtocell to the subscriber comprises the computer system flagging a profile of the subscriber with a flag, wherein the flag serves to indicate that the subscriber is a candidate to which to offer to provide a femtocell.

14. The method of claim 1, wherein the process comprises a communication to the subscriber, wherein the communication is selected from the group consisting of an email message, a text message, a phone call, and a letter sent via postal mail.

15. The method of claim 1, further comprising:
   after the computer system initiating a process of offering to provide a femtocell to the subscriber, offering to provide the femtocell to the subscriber.

16. A method comprising:
   a computer system making a first determination that a level of wireless performance experienced by a mobile station of a subscriber at a given location is less than a first threshold level;
   the computer system making a second determination that the given location is a location associated with a billing address of the subscriber;
   the computer system making a third determination that a value of the subscriber to a wireless service provider is above a second threshold level; and
   in response to the first, second, and third determinations, the computer system initiating a process of offering to provide a femtocell to the subscriber.

17. The method of claim 16, wherein the second threshold level is a given marketing treatment value.

18. A system for offering a femtocell to a subscriber, the system comprising:
   a position-determining module;
   an analysis module; and
   a femtocell-offering module,
   wherein the position-determining module is configured to, for each of a plurality of mobile events of a mobile station of a given subscriber, determine a location where the mobile event occurred,
   wherein the analysis module is configured to (i) make a first determination that a level of wireless performance experienced by a mobile station of a subscriber at a given location is less than a threshold level and (ii) make a second determination that the given location is a location associated with a billing address of the subscriber,
   wherein the femtocell-offering module is configured to initiate a process of offering to provide a femtocell to the subscriber responsive to the first and second determinations.

19. The system of claim 18, wherein the position-determining module, the analysis module, and the femtocell-offering module each comprise at least one processor.

20. The system of claim 18, wherein the position-determining module, the analysis module, and the femtocell-offering module share a processor.

* * * * *